US011377349B2

(12) United States Patent
Okada et al.

(10) Patent No.: US 11,377,349 B2
(45) Date of Patent: Jul. 5, 2022

(54) SODIUM HYPOCHLORITE PENTAHYDRATE CRYSTALS AND METHOD FOR PRODUCING SAME

(71) Applicant: Nippon Light Metal Company, Ltd., Tokyo (JP)

(72) Inventors: Tomohide Okada, Shizuoka (JP); Hideo Shimazu, Shizuoka (JP); Hiromichi Ito, Shizuoka (JP); Yukihiro Sugiyama, Tokyo (JP); Takashi Toyama, Tokyo (JP); Kaoru Shimada, Tokyo (JP); Hiroshi Fujihisa, Ibaraki (JP); Satoshi Takeya, Ibaraki (JP); Takehiro Matsunaga, Ibaraki (JP); Yoshito Gotoh, Ibaraki (JP)

(73) Assignee: Nippon Light Metal Company, Ltd., Tokyo (JP)

( * ) Notice: Subject to any disclaimer, the term of this patent is extended or adjusted under 35 U.S.C. 154(b) by 404 days.

(21) Appl. No.: 16/490,315

(22) PCT Filed: Feb. 6, 2018

(86) PCT No.: PCT/JP2018/004060
§ 371 (c)(1),
(2) Date: Aug. 30, 2019

(87) PCT Pub. No.: WO2018/159233
PCT Pub. Date: Sep. 7, 2018

(65) Prior Publication Data
US 2020/0010320 A1 Jan. 9, 2020

(30) Foreign Application Priority Data
Mar. 2, 2017 (JP) .............................. JP2017-039427

(51) Int. Cl.
*C01B 11/06* (2006.01)

(52) U.S. Cl.
CPC ................................ *C01B 11/062* (2013.01)

(58) Field of Classification Search
None
See application file for complete search history.

(56) References Cited

U.S. PATENT DOCUMENTS 4,071,605 A * 1/1978 Wojtowicz ................ D06L 4/23
423/503
9,434,616 B2 * 9/2016 Cawlfield ............. C01B 11/068

FOREIGN PATENT DOCUMENTS

| JP | S4842796 B1 | 12/1973 |
| JP | S4842797 B1 | 12/1973 |

(Continued)

OTHER PUBLICATIONS

H.L. Yakel, "Systematic multiple diffraction in equi-inclination Weissenberg geometry", Acta Crystallographica, 1962, pp. 1188, vol. 15, USA; cited in Specification.

(Continued)

*Primary Examiner* — Joseph D Anthony
(74) *Attorney, Agent, or Firm* — Rankin, Hill & Clark LLP (57) ABSTRACT

Provided are sodium hypochlorite pentahydrate crystals capable of long-term storage that have improved stability of sodium hypochlorite pentahydrate, which is effective as an oxidizing 5 agent or bactericide, in the vicinity of normal temperatures, and a method for producing the same. The sodium hypochlorite pentahydrate crystals are such that peaks appear at the locations of the angles of diffraction described in Table 1 of claim 1 over a range of 10°≤2θ (angle of diffraction)≤65° as measured by powder X-ray diffraction using a CuKα radiation source.

4 Claims, 2 Drawing Sheets

(56) References Cited

FOREIGN PATENT DOCUMENTS

| | | | |
|---|---|---|---|
| JP | S6081003 | A | 5/1985 |
| JP | H11255503 | A | 9/1999 |
| JP | 2000290003 | A | 10/2000 |
| JP | 2007169129 | A | 7/2007 |
| JP | 2012188327 | A | 10/2012 |
| JP | 2014169215 | A | 9/2014 |
| JP | 2015124108 | A | 7/2015 |
| JP | 2015124110 | A | 7/2015 |
| JP | 2015533775 | A | 11/2015 |
| WO | 2014070928 | A2 | 5/2014 |
| WO | 2016201397 | A1 | 12/2016 |

OTHER PUBLICATIONS

National Institute of Technology, Sasebo College Research Report, 1970, pp. 133-138, vol. 7, Japan; cited in Specification.

\* cited by examiner

FIG. 1

```
40% by mass to 48% by mass aqueous NaOH solution
                    │
                    │ ←──── Cl₂ + Air
                    ▼
          ┌──────────────────┐
          │ Chlorination step │   First step
          └──────────────────┘
                    │
                    ▼
          ┌──────────────────────┐
          │ Solid-liquid separation │   Second step
          │       step 1         │
          └──────────────────────┘
                    │
             ┌──────┴──────┐
             ▼             ▼
         Filtrate 1       NaCl
             │
             ▼
          ┌──────────────────┐
          │ Crystallization step │   Third step
          └──────────────────┘
                    │
                    ▼
          ┌──────────────────────┐
          │ Solid-liquid separation │   Fourth step
          │       step 2         │
          └──────────────────────┘
                    │
             ┌──────┴──────┐
             ▼             ▼
   Sodium hypochlorite   Filtrate 2
      pentahydrate
```

FIG. 2

SODIUM HYPOCHLORITE PENTAHYDRATE CRYSTALS AND METHOD FOR PRODUCING SAME

FIELD

The present invention relates to highly stable sodium hypochlorite pentahydrate crystals and a method for producing the same.

BACKGROUND

Sodium hypochlorite (NaOCl) is known to have superior bactericidal and bleaching actions, is used in bactericidal applications such as in pools, water system, sewerage system and household applications, in bleaching applications such as in the papermaking industry or textile industry, and as a chemical for wastewater treatment, and is also widely used as an oxidizing agent in the field or organic synthesis. General-purpose grade sodium hypochlorite is available commercially for industrial use as an aqueous solution having an effective chlorine concentration of about 12% by mass, and contains about 12% by mass of a by-product in the form of sodium chloride (NaCl). In addition, in water purification and bactericidal applications, low-chloride aqueous sodium hypochlorite aqueous solutions are commercially available having a sodium chloride concentration of 4% by mass or less or 2% by mass or less.

Water supplies in Japan are provided with an environment that allows consumption of safe water through water supply management in accordance with the Waterworks Law. Requirements of water supplied from water supply system are stipulated in Article 4 of the Waterworks Law, and are specifically defined in the "Ministerial Ordinance on Water Quality Standards" (Ministry of Health, Labor and Welfare Ordinance No. 101, May 30, 2003).

Methods for evaluating water supply chemicals used in water supplies are stipulated in "Pest Method Guidelines for Evaluating Water Supply Chemicals" (Notification of the Deputy Director of the Water Supply Maintenance Division No. 21, Mar. 31, 2000).

Japanese waterworks standards (JWWA) define quality in terms of water purification chemicals. Aqueous sodium hypochlorite solution is generally widely used as a water purification chemical, and restrictions on impurities in the form of bromic acid and chloric acid contained therein have been tightened resulting in revision of the standards for aqueous sodium hypochlorite solutions and the establishment of standards for first class and special grade products. The newly enacted special grade standards severely restrict the concentrations of bromic acid and chloric acid in aqueous sodium hypochlorite solutions to 10 mg/kg or less and 2000 mg/kg or less, respectively.

A known example of a method for producing these highly pure aqueous sodium hypochlorite solutions having extremely low concentrations of impurities and a prescribed effective chlorine concentration consists of precipitating sodium hypochlorite as crystals in the form of sodium hypochlorite pentahydrate and then dissolving the resulting sodium hypochlorite pentahydrate crystals in water (PTL2).

An impurity in the form of sodium chlorate is known to be formed in an aqueous solution by a disproportionation reaction represented by the formula below. This reaction is known to occur more easily the higher the concentration of sodium hypochlorite, the higher the storage temperature, and in the presence of sodium chloride. In other words, in the case of an aqueous solution, since an increase in the amount of sodium chlorate cannot be avoided during storage, nearly all such aqueous solutions are distributed as aqueous solutions having a concentration of about 12% by mass in order to suppress the formation thereof.

$$3NaOCl \rightarrow NaClO_3 + 2NaCl \qquad \text{(Formula 1)}$$

If it were possible to distribute sodium hypochlorite pentahydrate in the form of stable and highly concentrated sodium hypochlorite pentahydrate (having a theoretical effective chlorine concentration of 43.1% by mass), it would be possible to supply highly pure sodium hypochlorite free of sodium bromate or sodium chlorate for use in a water supply. In addition, improvement of transport efficiency due to being transported in a highly concentrated form can be expected, and improved volumetric efficiency of the reaction tank and reduction in wastewater volume can be expected in the case of using as an oxidizing agent for organic synthesis.

However, since conventional sodium hypochlorite pentahydrate exhibits poor stability in the vicinity of room temperature, it has the problem of decomposing during storage.

In NPL1, sodium chloride that has precipitated following chlorination of 50% by mass sodium hydroxide at 1° C. to 3° C. is filtered at 10° C., the filtrate is forcibly cooled, and after filtering out the resulting greenish-yellow crystals, the filtrate is recrystallized with water to obtain needle crystals of sodium hypochlorite pentahydrate (melting point: 25.5° C.). Moreover, the results of X-ray structural analysis thereof have been reported and the pentahydrate crystals have been reported to adopt the form of orthorhombic primitive crystal lattice, with each having a unit cell size such that a=8.08 angstrom, h=16.06 angstrom, c=5.33 angstrom, and adopting a space group of any of Pmm2, Pmmm or P222, with four units of sodium hypochlorite pentahydrate having been reported to be packed filled in the lattice. In addition, the same literature clearly shows that Feher and Talipia reported in 1944 that the unit cell size is such that a=7.91 angstrom, b=15.84 angstrom and c=5.28 angstrom.

In NPL2, solid sodium hydroxide was added to a 24% by mass aqueous sodium hydroxide solution each time followed by blowing in chlorine to produce a aqueous sodium hypochlorite solution having an effective chlorine concentration of 30% by mass or more, and after filtering out the precipitated sodium chloride, a portion of this solution was cooled with dry ice to form nuclei of sodium hypochlorite pentahydrate crystals after which sodium hypochlorite pentahydrate was obtained in the form of a pale yellow needle crystals by returning to the original solution. In NPL2, the storage stability of this sodium hypochlorite pentahydrate having an effective chlorine concentration of 40.1% by mass was investigated by storing at a temperature of 10° C. while stoppered in air. The effective chlorine concentration decreased to 38.6% by mass on day 1 and decreased to 36.2% by mass on day 7, and storage stability was not obtained.

In PTL1, chlorination was carried out while adding a 48% by mass aqueous sodium hydroxide solution followed by separating the precipitated sodium chloride to produce an aqueous sodium hypochlorite solution having an effective chlorine concentration of 20% by mass or more (25.2% by mass in Example 1) and then cooling this solution, holding at −10° C. to 5° C., and centrifuging the precipitated crystals to obtain sodium hypochlorite pentahydrate crystals. The stability of the sodium hypochlorite pentahydrate at 21° C. to 24° C. is disclosed in PTL1, and although the effective chlorine concentration at the start was 41.3% by mass, this concentration had decreased to 20.8% by mass on day 7, and storage ability remained low.

PTL2 discloses a method for producing sodium hypochlorite pentahydrate. In summary of this method, in a chlorination step chlorine gas is introduced into a 38% by weight to 60% by weight aqueous sodium hydroxide solution and the sodium hydroxide solution is chlorinated at a reaction temperature of 25° C. to 30° C. and precipitated by-product sodium chloride crystals are separated and removed followed by recovering highly concentrated aqueous sodium hypochlorite solution having a sodium hypochlorite concentration of 30% by weight to 38% by weight, and in a crystallization step, the aforementioned highly concentrated aqueous sodium hypochlorite solution is cooled to a cooling temperature of 10° C. to 22° C. in the presence of seed crystals of sodium hypochlorite pentahydrate in a crystallization tank integrating a condenser and crystallize to precipitate sodium hypochlorite pentahydrate followed by subjecting to solid-liquid separation to obtain sodium hypochlorite pentahydrate, PTL3 discloses a method for producing sodium hypochlorite pentahydrate. In summary thereof, this method includes a chlorination step for carrying out a chlorination reaction by introducing chlorine gas into a 48% by mass aqueous sodium hydroxide solution, a separation step (1) for separating the by-product sodium chloride that precipitated in the chlorination step from the reaction solution to obtain a Filtrate 1, a crystallization step (1) for cooling the Filtrate 1 and precipitating highly pure sodium hypochlorite pentahydrate crystals (1) in the presence of a seed at 15° C., a separation step (2) for separating and recovering the crystals (1) from the reaction solution that has gone through the crystallization step (1) together with obtaining a Filtrate 2, a crystallization step (2) for cooling the Filtrate 2 to 5° C. in the presence of seed crystals of sodium hypochlorite pentahydrate and precipitating crystals 2 of highly pure sodium hypochlorite pentahydrate, and a separation step (3) for separating and recovering the crystals 2 from the reaction solution that has gone through the crystallization step (2) together with obtaining a Filtrate 3. In other words, this method is characterized by precipitating sodium hypochlorite pentahydrate in two stages.

Although both PTL2 and PTL3 describe that sodium hypochlorite pentahydrate is precipitated by blowing in only chlorine gas, there is no mention of the stability of the pentahydrate crystals thereof.

PTL4 discloses a highly pure sodium hypochlorite pentahydrate and a method for producing the same. This method is provided with a first step for reacting a 45% by mass aqueous sodium hydroxide solution and chlorine gas at a pH of 10 or higher to obtain a mother liquor, a second step for solid-liquid separation of sodium chloride from the mother liquor, a third step for adding sodium hydroxide and seed crystals to the mother liquor (having an effective chlorine concentration of 20% by mass or more) set to a prescribed cooling starting temperature, a fourth step for cooling the mother liquor to a prescribed cooling end temperature at a cooling rate of 1° C./hour to 20° C./hour and precipitating sodium hypochlorite pentahydrate crystals, and a fifth step for solid-liquid separation of sodium hypochlorite from the sodium hypochlorite pentahydrate crystals.

In PTL4, stability at a temperature of 22° C. is investigated. Although the effective chlorine concentration was initially 41.5% by mass, it decreased to 39.4% by mass on day 7 and to 32.5% on day 14. In addition, although PTL4 states that sodium hypochlorite pentahydrate was produced that was stable over the course of three months or more, these refer to results in the case of having stored under slight refrigeration of a temperature of 15° C. or lower, making it difficult to say that this sodium hypochlorite pentahydrate is stable in the vicinity of room temperature. In addition, effective chlorine concentration decreased to 29.7% by mass to 36.5% by mass after three months had elapsed even at a temperature of 15° C.

As is described by the literature, it is difficult to produce sodium hypochlorite pentahydrate that is stable in the vicinity of room temperature, and since it was difficult to suppress decomposition reactions consisting mainly of a disproportionation reaction, the transport and storage of the pentahydrate requires both cooling equipment costs and cooling running costs, thereby resulting in an increase in production cost.

CITATION LIST

Patent Literature

[PTL1] Japanese Examined Patent Publication No. S48-42797
[PTL2] Japanese Unexamined Patent Publication No. 2000-290003
[PTL3] Japanese Unexamined Patent Publication No. 2015-124108
[PTL4] Japanese Unexamined Patent Publication No. 2014-169215

Non-Patent Literature

[NPL1] Acta Crystallographica, 1962, 15, 1188
[NPL2] National Institute of Technology, Sasebo College Research Report, 1970, 7, 133

SUMMARY

Technical Problem

An object of the present invention is to make the crystal structure of sodium hypochlorite pentahydrate more stable than conventional products and provide sodium hypochlorite pentahydrate that has high storage stability.

Solution to Problem

As a result of examining methods for producing sodium hypochlorite pentahydrate reported thus far and conducting extensive research to produce sodium hypochlorite pentahydrate crystals having a more stable crystal structure, the inventors of the present invention found that crystals having a structure that demonstrates high storage stability can be obtained, thereby leading to completion of the present invention.

(1) Sodium hypochlorite pentahydrate crystals for which peaks appear at the locations of the angles of diffraction described in Table 1 over a range of 10°≤2θ (angle of diffraction)≤65° as measured by powder X-ray diffraction using a CuKα radiation source.

TABLE 1

| $2\theta\ (\pm 0.2°)$ |
|---|
| 24.0 |
| 28.1 |

TABLE 1-continued

| 2θ (±0.2°) |
| --- |
| 33.6 |
| 36.4 |

(2) Sodium hypochlorite pentahydrate crystals for which peaks appear at the locations of the angles of diffraction described in Table 2 over a range of 10°≤2θ (angle of diffraction)≤65°.

TABLE 2

| 2θ (±0.2°) |
| --- |
| 15.4 |
| 19.7 |
| 19.8 |
| 20.6 |
| 21.9 |
| 22.7 |
| 24.0 |
| 25.8 |
| 27.5 |
| 28.1 |
| 29.5 |
| 29.7 |
| 29.7 |
| 32.2 |
| 33.1 |
| 33.4 |
| 33.6 |
| 35.7 |
| 36.4 |
| 37.2 |
| 37.4 |
| 40.9 |
| 43.6 |
| 43.7 |
| 44.5 |
| 44.7 |
| 47.5 |
| 47.7 |
| 47.8 |
| 47.9 |
| 48.3 |

(3) The sodium hypochlorite pentahydrate crystals described in (2) above, wherein peaks appear at the locations of the angles of diffraction described in Table 3 over a range of 10°≤2θ (angle of diffraction)≤65°.

TABLE 3

| 2θ (±0.2°) |
| --- |
| 10.9 |
| 12.2 |
| 20.6 |
| 24.5 |
| 25.8 |
| 28.6 |
| 32.2 |
| 32.7 |
| 34.0 |
| 34.3 |
| 35.0 |
| 35.2 |
| 35.3 |
| 35.4 |
| 36.3 |
| 37.7 |
| 37.8 |
| 39.1 |
| 40.0 |
| 41.1 |
| 43.8 |

TABLE 3-continued

| 2θ (±0.2°) |
| --- |
| 44.2 |
| 45.1 |
| 45.2 |
| 46.8 |
| 47.0 |
| 48.1 |
| 48.2 |
| 49.4 |
| 50.3 |
| 51.0 |
| 51.7 |
| 51.8 |
| 52.7 |
| 53.0 |
| 53.3 |
| 53.5 |
| 53.7 |
| 54.0 |
| 55.3 |
| 56.1 |
| 56.3 |
| 56.5 |
| 56.7 |
| 58.6 |
| 58.8 |
| 59.0 |
| 59.2 |
| 59.5 |
| 61.3 |
| 61.6 |
| 62.0 |
| 62.1 |
| 63.4 |
| 64.0 |
| 64.2 |
| 64.4 |

(4) The sodium hypochlorite pentahydrate crystals described in any of (1) to (3) above, wherein the crystal structure is orthorhombic, has a primitive crystal lattice, and the size of the unit cells is such that a=16.3±0.1 (angstrom), b=5.4±0.1 (angstrom) and c=16.2±0.1 (angstrom).

(5) A method for producing sodium hypochlorite pentahydrate crystal grains, including:

a first step for introducing chlorine into a 40% by mass to 48% by mass aqueous sodium hydroxide solution and chlorinating at a reaction temperature of 20° C. to 32° C. wherein the chlorine is diluted with air and introduced by dividing into two stages;

a second step for solid-liquid separation of a slurry containing precipitated by-product sodium chloride crystals and recovering an aqueous sodium hypochlorite solution having a sodium hypochlorite concentration of 28% by mass or more;

a third step for cooling the aqueous solution containing sodium hypochlorite pentahydrate recovered in the second step to a cooling temperature of 5° C. to 25° C. in a crystallization tank integrating a condenser and a crystallizer to precipitate sodium hypochlorite pentahydrate; and, a fourth step for solid-liquid separation of the sodium hypochlorite pentahydrate crystals precipitated in the third step to obtain sodium hypochlorite pentahydrate crystal grains.

Advantageous Effects of Invention

According to the present invention, since sodium hypochlorite pentahydrate can be produced that is stable even in the vicinity of room temperature, cooling equipment during storage can be omitted, cooling running costs can be reduced, and cooling costs during transport can be reduced.

DESCRIPTION OF EMBODIMENTS

The following provides a detailed explanation of the method for producing stable sodium hypochlorite pentahydrate according to the present invention.

[Method for Producing Stable Sodium Hypochlorite Pentahydrate]

Figure 1:
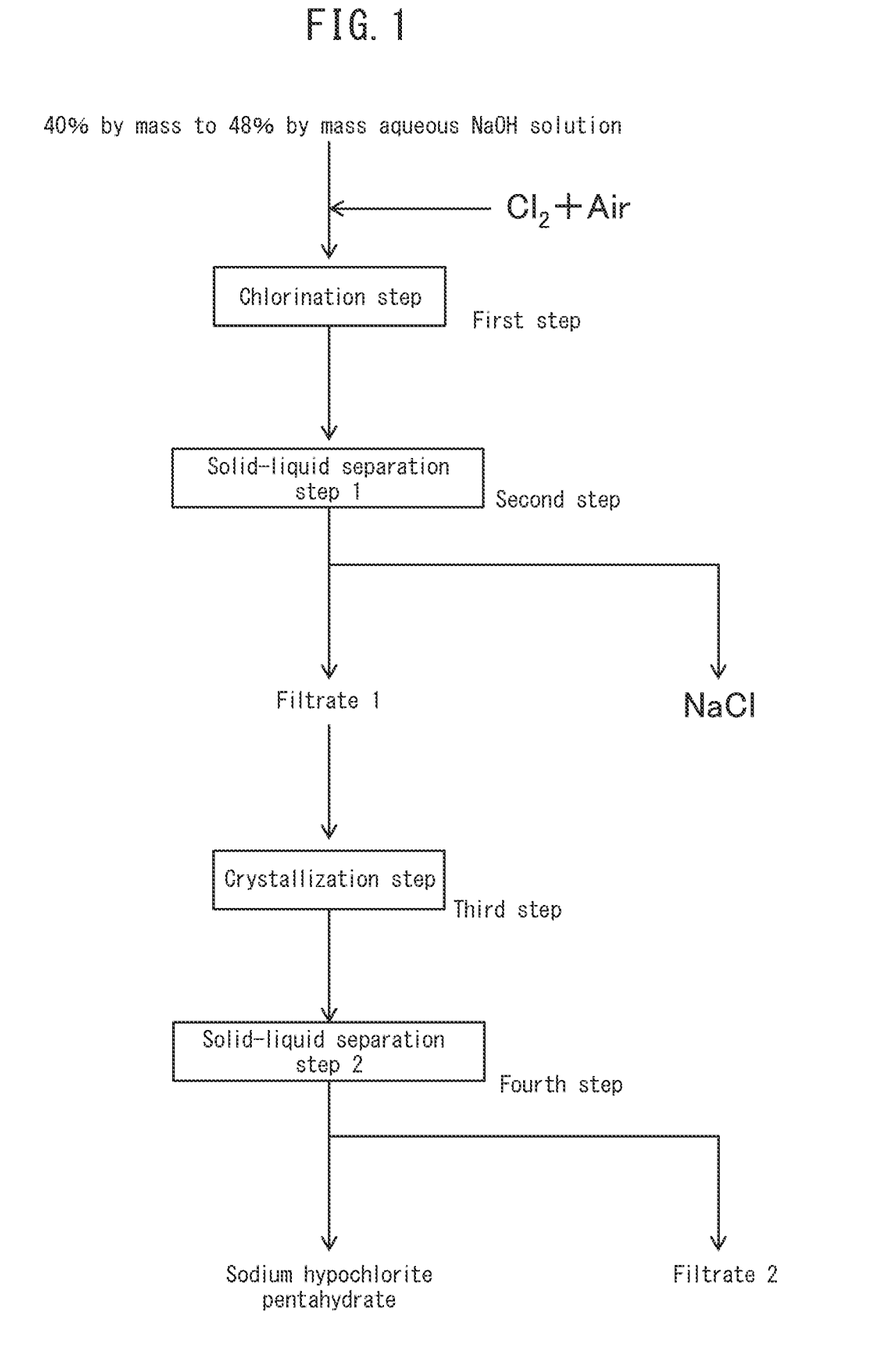
FIG. 1 is a schematic diagram of one aspect of the flow of a production process of sodium hypochlorite pentahydrate crystals according to the present invention.

The method for producing sodium hypochlorite pentahydrate crystals of the present invention includes a chlorination step (first step), a sodium chloride separation step (second step), a crystallization step (third step) and a solid-liquid separation step (fourth step) as shown in FIG. 1.

[Chlorination Step (First Step)]

In the chlorination step, as a result of introducing chlorine gas into an aqueous sodium hydroxide solution, the reaction proceeds according to the formula described below resulting in the obtaining of an aqueous solution of sodium hypochlorite.

$$2NaOH + Cl_2 \rightarrow NaOCl + NaCl + H_2O \quad \text{(Formula 2)}$$

In the reaction step of the present invention, although chlorination can be carried out continuously with a single tank, it is required to employ a two-stage continuous stirred tank reactor (CSTR) having a first chlorination step for chlorinating the raw material aqueous sodium hydroxide solution and a second chlorination step for further chlorinating the first reaction solution obtained in this step. In addition, a CSTR can also be used that consists of three stages or more.

In the first chlorination step, sodium hydroxide having a concentration of 40% by mass to 48% by mass is used preferably, and the reaction temperature is preferably 20° C. to 32° C. in order to suppress decomposition of sodium hypochlorite. If the reaction temperature is within this range, the chlorination reaction proceeds smoothly, the formation of sodium chlorate and the like accompanying a disproportionation reaction can be suppressed, and sodium hypochlorite pentahydrate can be produced that has few impurities. In the first chlorination step, the chlorination reaction is allowed to proceed so that the sodium hypochlorite concentration is 29% by mass or more and the sodium hydroxide concentration is 3% by mass to 6% by mass. The finished reaction mixture is sent to the second chlorination step.

Although the aforementioned chlorine gas can be used after diluting with nitrogen or air and the like, it is preferably used after diluting with air. As a result of introducing chlorine gas into a reactor after diluting with air, heat generated by the reaction of chlorine at the gas-liquid interface is alleviated and the formation of by-products such as sodium chlorate can be inhibited. In the case of using a scrubber and the like, blowing in chlorine gas and air separately without mixing in advance makes it possible to demonstrate the effects thereof. In the case of blowing in chlorine gas with an ejector and the like, this can also be accommodated by mixing immediately prior to blowing.

The dilution factor of the chlorine gas in terms of the volume ratio of chlorine gas/air is preferably 0.5 to 1.0. If the dilution factor is lower than 0.5, productivity may worsen, while if the dilution factor exceeds 1.0, the amount of by-products such as sodium chlorate formed ends up increasing. Diluting with air causes carbon dioxide in the air to dissolve in the sodium hydroxide resulting in the coexistence of sodium carbonate.

The temperature of the reaction solution in the chlorination step is preferably within the range of 20° C. to 30° C. and chlorination proceeds until the sodium hypochlorite concentration becomes 23% by mass to 27% by mass, the sodium chloride concentration becomes 22% by mass to 26% by mass, and the sodium hydroxide concentration becomes 1.1% by mass to 1.5% by mass. The finished liquid is a slurry in which supersaturated sodium chloride has precipitated.

By dividing the chlorination step of the first step into two stages or three stages, degradation of hypochlorous acid due to overheating at the air-liquid interface can be inhibited, thereby offering the advantage of facilitating control of the composition following completion of the reaction.

[Sodium Chloride Separation Step (Second Step)]

In the sodium chloride separation step, the result of solid-liquid separation of sodium chloride from the liquid obtained at completion of chlorination serves as the mother liquor of the subsequent crystallization step. More specifically, aqueous sodium hypochlorite solution formed following chlorination contains a large amount of by-product sodium chloride crystals. Therefore, in the sodium chloride separation step, solid-liquid separation is carried out with by centrifuging or filtration and the like, although not limited thereto. The resulting filtrate is preferably precooled when sent to the crystallization device of the next step. Precooling is carried out for the purpose of reducing the amount of heat removed in the crystallization tank of the next step, and the filtrate temperature is preferably within the crystallization starting temperature plus 2° C. and more preferably within the crystallization starting temperature plus 0° C. to 1° C. If the precooling temperature is equal to or lower than the crystallization starting temperature, crystals precipitate in the heat exchanger resulting in increased susceptibility to the line freezing.

Based on the relationship with the efficiency of crystallization carried out in the subsequent step, the concentration of the sodium hypochlorite solution following separation of sodium chloride is preferably 28% by mass or more and more preferably 30% by mass to 34% by mass. In the case the concentration of the sodium hypochlorite solution is 34% by mass or more, since the sodium hypochlorite solution becomes supersaturated thereby resulting in scaling on the surface of the condenser leading to poor heat transfer efficiency, it is preferable to dilute with soft water.

[Crystallization Step (Third Step)]

In the present invention, aqueous sodium hypochlorite solution (filtrate of the solid-liquid separation step) that has been subjected to the previous step (second step) is introduced into a crystallization device where it undergoes crystallization.

A temperature of 5° C. to 25° C. is preferable, while a temperature of 10° C. to 24° C. is more preferable, for the starting temperature of this crystallization. In the case of precipitating by batch treatment, the aqueous sodium hypochlorite solution is preferably precipitated starting at a temperature of about 15° C. to 22° C.

The sodium hypochlorite solution obtained in the previous step is cooled to the crystallization starting temperature and sodium hypochlorite pentahydrate crystals serving as seed crystals are added so that the seed addition ratio Cs=0.04 to 0.08 (Cs=Ws/Wth; Ws: amount of seed, Wth: theoretical precipitated amount). At this time, although there are no particular problems even if seed crystals are not added, a small amount of seed crystal can be used in the manner described above for the purpose of suppressing the occurrence of crystallization on the sides of the crystallization tank walls and increasing crystallization rate. With respect to cooling, an aqueous sodium hypochlorite pentahydrate slurry solution can be obtained by cooling from the liquid temperature at the start of crystallization to 10° C. to 15° C. over the course of 4 to 6 hours while controlling the coolant temperature so that the temperature difference $\Delta T$ between the temperature of the mother liquor and the coolant temperature is 3° C. to 4° C. in order to prevent scaling on the surface of the condenser due to overcooling.

[Separation Step (Fourth Step)]

In the present invention, sodium hypochlorite pentahydrate crystals that are stable in the vicinity of room temperature can be obtained by using a centrifuge to carry out solid-liquid separation on the slurry solution containing sodium hypochlorite pentahydrate crystals obtained in the crystallization step. Since the amount of liquid adhered to the crystals decreases as the centrifugal effect increases, centrifuging conditions are such that solid-liquid separation is preferably carried out at a centrifugal effect of 1000 G or more, and more preferably 1500 G or more.

In addition, since there is the risk of the sodium hypochlorite pentahydrate crystals decomposing due to excessive contact with carbon dioxide, the separation step is preferably carried out in a closed system or nitrogen atmosphere. However, contact with carbon dioxide in an amount equal to or less than the amount that neutralizes adhered caustic substances does not present a problem.

When stability of the sodium hypochlorite pentahydrate crystals obtained in this manner was measured at 20° C., sodium hypochlorite pentahydrate having an initial effective chlorine concentration of 42.1% by mass had an effective chlorine concentration of 41.6% even after one week, thereby making it possible to confirm the effective storage stability thereof.

The crystal structure of the sodium hypochlorite pentahydrate crystals produced in the manner described above was measured by X-ray diffraction under cooling with liquid nitrogen. In addition, the resulting data was analyzed using molecular dynamics (MD) simulation using Rietveld analysis and density functional theory (DFT) calculations. Details and results of the analysis method are as described below.

(1) Device Used for Analysis (Manufacturer, Model No.)

Rigaku Corp., Ultima III (CuK$\alpha$ radiation source ($\lambda$=1.5418 angstrom), 40 kV, 40 mA)

(2) Sample Treatment Procedure

A mortar and pestle were cooled to about −100° C. with liquid nitrogen and the sample was crushed for 30 minutes to obtain a powder. The sample was filled into a glass sample holder in the shape of a flat plate and having an indentation of a depth of 2 mm. The procedure thus far was carried out in a glove bag containing a dry nitrogen atmosphere. The sample holder was placed on the sample stage within the X-ray device that had been precooled to −150° C. and powder X-ray analysis was carried out while controlling the temperature.

(3) Analytical Software Used (Manufacturer, Software Name)

Materials Studio X-Cell available from Biovia Corp. and TOPAS available from Bruker Corp. were used for indexing powder X-ray diffraction patterns. TOPAS available from Bruker Corp. was used to search for the initial structural model and determination of space group. Materials Studio Reflex available from Biovia Corp. was used for Rietveld analysis of the powder X-ray diffraction patterns. Material Studios Castep available from Biovia Corp. was used for optimization of the atomic coordinates of hydrogen as determined by DFT calculations and for MD simulation. Details and results of the analysis method are as described below.

(4) Analysis Method

The diffraction angles of about 20 peaks were read starting from the lowest angle of the powder X-ray diffraction patterns and an orthorhombic lattice was obtained by indexing the patterns. Each of the various types of allowed space group candidates starting from the side where they disappeared were verified as to whether or not a structural model could be assembled that was able to reproduce the peak strengths of the X-ray patterns. As a result, space group Pbca was determined to be optimal.

The lattice constants and atomic coordinates for atoms other than hydrogen were optimized by Rietveld analysis of the resulting structural model. Atomic coordinates of the hydrogen atoms of water molecules were estimated by structural optimization determined by DFT calculations and by enthalpy calculations. MD simulations were carried out on the resulting structural model by DFT calculations to confirm that the model was stable.

(5) Analysis Results

The resulting structural model adopted an orthorhombic primitive crystal lattice and the size of the unit cells was such that a=16.3±0.1 (angstrom), b=5.4±0.1 (angstrom) and c=16.2±0.1 (angstrom), respectively. Furthermore, the manner in which a, b and c are adopted can be interchanged cyclically. Thus, unit cell sizes for which the order of the axes has been interchanged in the manner of a=16.2±0.1 (angstrom), b=16.3±0.1 (angstrom) and c=5.4±0.1 (angstrom) or a=5.4±0.1 (angstrom), b=16.2±0.1 (angstrom) and c=16.3±0.1 (angstrom) are equivalent lattices thereto.

The resulting sodium hypochlorite pentahydrate was determined to have a different crystal structure from that reported in NPL1. In other words, the unit cells of these sodium hypochlorite pentahydrate crystals have a crystal lattice that differs from that of previously known sodium hypochlorite pentahydrate crystals. In other words, these sodium hypochlorite pentahydrate crystals were determined to have storage stability.

In the production of the sodium hypochlorite pentahydrate crystals of the present invention, by employing the production process from the first step to the third step as previously describe, sodium hypochlorite pentahydrate crystals were able to be obtained that are stable in the vicinity of room temperature.

A study of various factors in each step from the first step to the third step was necessary to complete the invention. Despite the efforts of persons with ordinary skill in the art, the providing of a long awaited sodium hypochlorite pentahydrate that is stable in the vicinity of room temperature had yet to be achieved. Namely, it was necessary to examine each of the factors of blowing in chlorine, dilution of chlorine, concentration of NaOH used, chlorination temperature, chlorination time as well as the end composition of NaOCl, NaCl or NaOH and the like in the first step, each of the factors of end temperature, end composition of NaOCl or NaCl and the like as well as soft water dilution in the second step, and each of the factors of operating method, crystallization starting temperature, cooling time, cooling rate and end temperature in the third step.

As a result of conducting extensive studies on and carefully examining the aforementioned factors, the inventors of the present invention succeeded in obtaining the sodium hypochlorite pentahydrate crystals of the present invention in particular by dividing the blowing in of chlorine into two stages and diluting the chlorine by blowing in air in the first step, controlling the crystallization starting temperature of the NaOCl solution in the third step in the second step, and employing a batch type operating method and controlling the cooling time, cooling rate and end temperature in the third step. In addition, the target stable sodium hypochlorite pentahydrate crystals are also obtained by continuous operation in the presence of seed crystals in the third step. Although the extent to which of these factors succeeds in achieving these objectives is currently not clear, the inventors of the present invention succeeded in obtaining sodium hypochlorite pentahydrate crystals that are stable in the vicinity of room temperature by altering these various factors. It is clear that this could not have been easily conceived even by a person with ordinary skill in the art.

The present invention discloses a technical idea relating to long-awaited novel sodium hypochlorite pentahydrate crystals that are stable in the vicinity of room temperature.

Although the following provides a more detailed explanation of the present invention based on examples thereof, the present invention is not limited to these examples.

Example 1 (Invention Example)

A two-stage continuous stirred tank reactor (CSTR) (volume: 3.5 m$^3$×2 tanks) provided with a stirrer, scrubber and external circulating condenser was used in the chlorination step (first step). Raw material in the form of 48% by mass aqueous sodium hydroxide solution was added thereto at 860 kg/hr together with introducing chlorine gas diluted to ½ the undiluted concentration with air using a scrubber while adjusting the supplied amount so that the sodium chloride concentration in the residual water was 2% by mass followed by carrying out chlorination while cooling so that the reaction temperature was 24° C. to 30° C. At this time, the retention time in the reaction tanks was about 720 minutes.

In the sodium chloride separation step (second step), reactant slurry extracted from the reaction tanks of the chlorination step at 1188 kg/hr was subjected to solid-liquid separation with a centrifuge. As a result, precipitated sodium chloride was obtained at the rate of 254 kg/hr and aqueous sodium hypochlorite solution (Filtrate 1), comprised of sodium hypochlorite having a concentration of 35% by mass and sodium chloride having a concentration of 5.4% by mass, was obtained at the rate of 934 kg/hr.

Soft water was added to Filtrate 1 to adjust the sodium hypochlorite concentration to 31.9% by mass, the sodium chloride concentration to 4.9% by mass, and the sodium hydroxide concentration to 1.5% by mass.

In the crystallization step (third step), 8942 kg of the aforementioned Filtrate 1 were added to a titanium crystallization tank (volume: 7 m$^3$) provided with a stirrer, jacket, coil condenser and external circulation pump while adjusting the temperature to 24° C., and cooling was started so that the temperature difference ΔT between the temperature of the Filtrate 1 and the coolant temperature was 3° C. to 4° C. followed by cooling to 14° C. over the course of 7 hours. Crystal formation was observed in the crystallization tank starting at a temperature of 19° C.

In the separation step (fourth step), the slurry extracted from the circulation tank of the circulation step (third step) was subjected to liquid-solid separation with a centrifuge while holding the temperature in the crystallization tank at 14° C. As a result, 2850 kg of highly pure sodium hypochlorite pentahydrate crystals were obtained. The properties of the aqueous sodium hypochlorite solution used in the crystallization step (third step) and the sodium hypochlorite pentahydrate obtained in the separation step (fourth step) are shown in Table 4.

[Table 4]

TABLE 4

| Item | Aqueous sodium hypochlorite solution of crystallization step (third step) | Sodium hypochlorite pentahydrate after separation step (fourth step) |
|---|---|---|
| Effective chlorine concentration (mass %) | 31.9 | 42.1 |
| NaCl concentration (mass %) | 4.9 | 0.08 |
| NaOH concentration (mass %) | 1.5 | 0.07 |

Figure 2:
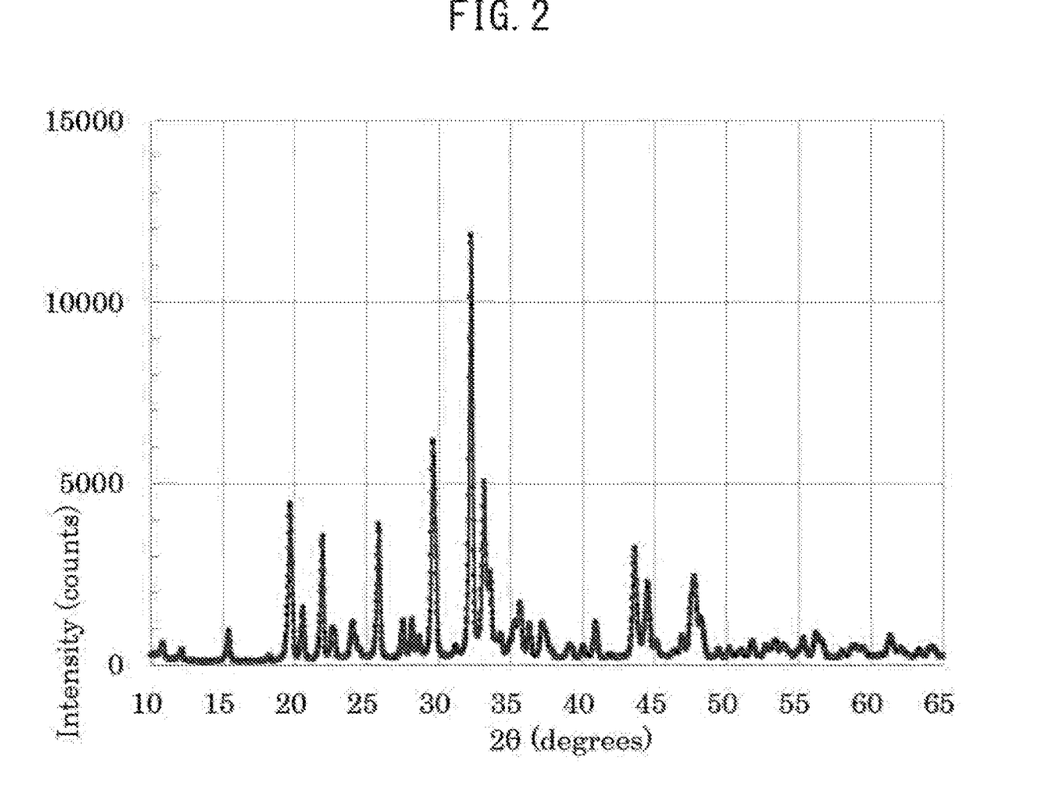
FIG. 2 is a graph indicating measurement data as measured by powder X-ray diffraction of sodium hypochlorite pentahydrate crystals of Example 1.

The crystal structure of the sodium hypochlorite pentahydrate crystals produced in this manner was measured by X-ray analysis while cooling with liquid nitrogen. The measurement data is shown in FIG. 2.

Those peaks exhibiting an intensity of 5 or more as the converted intensity value based on a value of 100 for the number of counts for 2θ=32.2° that demonstrated the highest intensity among the measurement results were as shown in Table 5.

TABLE 5

| 2θ (±0.2°) | Intensity |
|---|---|
| 15.4 | 6.9 |
| 19.7 | 32.9 |
| 19.8 | 9.4 |
| 20.6 | 10.1 |
| 21.9 | 27.4 |
| 22.7 | 7.9 |
| 24.0 | 8.9 |
| 25.8 | 28.4 |
| 27.5 | 8.0 |
| 28.1 | 8.0 |
| 29.6 | 30.5 |
| 29.7 | 21.6 |
| 29.7 | 13.3 |
| 32.2 | 100.0 |
| 33.2 | 38.8 |
| 33.4 | 9.8 |
| 33.6 | 16.1 |
| 35.7 | 12.5 |
| 36.4 | 5.5 |
| 37.2 | 6.8 |
| 37.4 | 5.9 |
| 40.9 | 8.2 |
| 43.6 | 23.9 |
| 43.7 | 7.5 |
| 44.5 | 17.0 |
| 44.7 | 5.7 |
| 47.5 | 7.6 |
| 47.7 | 10.5 |
| 47.8 | 10.2 |
| 47.9 | 6.7 |
| 48.3 | 5.8 |

Those peaks exhibiting an intensity of 1 to less than 5 according to the same criteria were as shown in Table 6.

TABLE 6

| 2θ (±0.2°) | Intensity |
|---|---|
| 10.9 | 3.4 |
| 12.2 | 2.5 |
| 20.6 | 1.4 |
| 24.5 | 2.9 |
| 25.8 | 4.3 |
| 28.6 | 3.7 |
| 32.2 | 3.6 |
| 32.7 | 1.1 |
| 34.0 | 1.1 |
| 34.3 | 3.3 |
| 35.0 | 1.7 |
| 35.2 | 3.4 |
| 35.3 | 3.8 |
| 35.4 | 2.3 |
| 36.3 | 1.8 |
| 37.7 | 1.4 |
| 37.9 | 1.1 |
| 39.1 | 1.6 |
| 40.0 | 2.6 |
| 41.1 | 1.2 |
| 43.9 | 1.4 |
| 44.2 | 3.1 |
| 45.1 | 1.8 |
| 45.2 | 1.7 |
| 46.8 | 2.1 |
| 47.0 | 2.7 |
| 48.1 | 2.7 |
| 48.2 | 3.8 |
| 49.5 | 1.8 |
| 50.3 | 1.3 |
| 51.0 | 1.4 |
| 51.7 | 1.2 |
| 51.8 | 2.1 |
| 52.7 | 2.3 |
| 53.0 | 1.2 |
| 53.3 | 2.0 |
| 53.5 | 2.4 |
| 53.7 | 1.1 |
| 54.0 | 2.5 |
| 55.3 | 4.5 |
| 56.1 | 2.1 |
| 56.3 | 4.3 |
| 56.5 | 1.3 |
| 56.7 | 1.7 |
| 58.6 | 1.5 |
| 58.8 | 1.2 |
| 59.0 | 1.9 |
| 59.2 | 1.5 |
| 59.5 | 1.4 |
| 61.3 | 4.7 |
| 61.6 | 2.1 |
| 62.0 | 1.0 |
| 62.1 | 1.3 |
| 63.4 | 1.0 |
| 64.0 | 1.2 |
| 64.2 | 1.5 |
| 64.5 | 1.5 |

Although there is the possibility that the values may vary somewhat due to error present during measurement such as in the measuring conditions, these results indicate characteristic peaks indicating the crystal structure of the sodium hypochlorite pentahydrate crystals of the present invention.

In addition, the resulting data was analyzed using molecular dynamics (MD) simulation using Rietveld analysis and density functional theory (DFT) calculations. Details and results of the analytical method are as previously described, the structural model obtained from analysis was determined to adopt an orthorhombic primitive crystal lattice, the space group was Pbca, and the size of the unit cells was such that a=16.3±0.1 (angstrom). b=5.4±0.1 (angstrom) and c=16.2±0.1 (angstrom), respectively.

According to NPL1, conventional crystals assemble orthorhombic crystals in which a=8.08 angstrom, b=16.06 angstrom and c=5.33 angstrom and contain four units of sodium hypochlorite pentahydrate therein. The 2θ locations of the peaks calculated from the lattice of this NPL1 were compared with those of Table 6 above. Whereupon, multiple peaks were observed in these crystals at 2θ locations that are unable to appear in the lattice of NPL1. This indicates that the crystal lattice per se that serves as the basis of the structure is different between these crystals and the crystals of NPL1. These peaks are shown in Table 7 below. Namely, since peaks at the locations shown in Table 7 do not appear in existing crystals, they can be said to be characteristic peaks indicating the crystal structure of the sodium hypochlorite pentahydrate according to the present invention. The four peaks described with circles in the following Table 7 in particular are easily distinguished based on their strong intensity as well.

TABLE 7

| 2θ (±0.2°) | Intensity | Converted intensity of 5% or more |
|---|---|---|
| 18.2 | 0.9 | |
| 24.0 | 8.9 | ○ |
| 24.5 | 2.9 | |
| 28.1 | 8.0 | ○ |
| 28.6 | 3.7 | |
| 33.6 | 16.1 | ○ |
| 34.3 | 3.3 | |
| 36.4 | 5.5 | ○ |
| 41.1 | 1.2 | |

As was previously described, the sodium hypochlorite pentahydrate crystals of Example 1 were determined to have a different crystal structure from conventional sodium hypochlorite pentahydrate crystals not having storage stability reported in NPL1.

Storage Stability Test

Sodium hypochlorite pentahydrate crystals obtained in Example 1 were placed in a polyethylene bag followed by removing the air and filling with nitrogen. Moreover, the crystals were placed in a Lamizip (Registered Trademark) Aluminum Bag manufactured by Seisannipponsha Ltd. having a three-layer structure consisting of polyethylene terephthalate (PET), aluminum (Al) and polyethylene (PE) followed by removing the air, filling with nitrogen and sealing. The bags were stored at 20° C. and 22° C. in the Cool Incubator (Model CN-25C) manufactured by Mitsubishi Electric Engineering Co., Ltd. Comparative results for the sodium hypochlorite pentahydrate crystals of Example 1 and the sodium hypochlorite pentahydrate described in the prior art serving as a comparative example are shown in Table 8. The following sodium hypochlorite pentahydrate samples were used as comparative examples.

Comparative Example 1 consisted of sodium hypochlorite pentahydrate obtained according to the method described in NPL2. Comparative Example 2 consisted of the sodium hypochlorite pentahydrate obtained according to the method described in PTL1. Comparative Example 3 consisted of the sodium hypochlorite pentahydrate obtained according to the method described in PTL2. Comparative Example 4 consisted of the sodium hypochlorite pentahydrate obtained according to the method described in PTL4.

TABLE 8

Results of Storage Stability Test

|  |  | Example 1 | Comp. Ex. 1 | Comp. Ex. 2 | Comp. Ex. 3 | Comp. Ex. 4 |
|---|---|---|---|---|---|---|
| Temperature (° C.) |  | 20 | 22 | 10 | 21~24 | 20 | 22 |
| At start | Effective chlorine concentration (mass %) | 42.1 | 42.1 | 40.1 | 41.3 | 42.1 | 41.5 |
| Day 1 | Effective chlorine concentration (mass %) | — | — | 38.6 | — | — | 41.2 |
| Day 2 | Effective chlorine concentration (mass %) | 41.9 | 41.9 | — | — | — | — |
| Day 3 | Effective chlorine concentration (mass %) | — | 41.8 | 38.0 | 26.8 | 42.1 | 41.0 |
| Day 7 | Effective chlorine concentration (mass %) | 41.6 | 40.8 | 36.2 | 20.8 | 41.8 | 39.4 |
| Day 13 | Effective chlorine concentration (mass %) | — | — | — | — | 41.5 | — |
| Day 14 | Effective chlorine concentration (mass %) | 41.3 | 36.5 | — | — | — | 32.5 |
| Day 17 | Effective chlorine concentration (mass %) | — | — | — | — | 35.7 | — |
| Day 21 | Effective chlorine concentration (mass %) | 40.1 | — | — | — | — | — |
| Day 23 | Effective chlorine concentration (mass %) | — | — | — | — | 29.9 | — |
| Day 31 | Effective chlorine concentration (mass %) | 38.5 | — | — | — | — | — |

Measurement of Effective Chlorine Concentration and Sodium Hypochlorite Concentration Effective chlorine concentration was calculated according to the iodine method in accordance with the following method. First, approximately 0.1 g of sodium hypochlorite pentahydrate crystals were weighed in a beaker and then dissolved with about 20 mL of ion exchange water. Approximately 2.0 g of potassium iodide and 10 mL of 50% aqueous acetic acid solution were added thereto. Free iodine was titrated with 0.1 N aqueous sodium thiosulfate solution (for volumetric analysis). At this time, the amount of 0.1 N aqueous sodium thiosulfate solution required for titration was defined as A mL and effective chlorine concentration (mass %) was determined by substituting that value into the following equation (1).

[Effective chlorine concentration (mass %)]=(35.45× 0.1×A/1000)÷sample (g)×100    (1)

[Sodium hypochlorite concentration (mass %)]=[Effective chlorine concentration mass %)]×74.44/ 70.91    (2)

Example 1 of the present invention obtained the best results in the storage stability test. This stability is thought to be the result of the difference in crystal structure.

The invention claimed is:
1. Sodium hypochlorite pentahydrate crystals for which peaks appear at the locations of the angles of diffraction described in Table 1 over a range of 10°≤2θ (angle of diffraction)≤65° as measured by powder X-ray diffraction using a CuKα radiation source.

TABLE 1

| 2θ (±0.2°) |
|---|
| 24.0 |
| 28.1 |
| 33.6 |
| 36.4 |

2. The sodium hypochlorite pentahydrate crystals according to claim 1 for which peaks appear at the locations of the angles of diffraction described in Table 2 over a range of 10°≤2θ (angle of diffraction)≤65°.

TABLE 2

| 2θ (±0.2°) |
|---|
| 15.4 |
| 19.7 |
| 19.8 |
| 20.6 |
| 21.9 |
| 22.7 |
| 24.0 |
| 25.8 |
| 27.5 |
| 28.1 |
| 29.5 |
| 29.7 |
| 29.7 |
| 32.2 |
| 33.1 |
| 33.4 |
| 33.6 |

TABLE 2-continued

| 2θ (±0.2°) |
|---|
| 35.7 |
| 36.4 |
| 37.2 |
| 37.4 |
| 40.9 |
| 43.6 |
| 43.7 |
| 44.5 |
| 44.7 |
| 47.5 |
| 47.7 |
| 47.8 |
| 47.9 |
| 48.3 |

3. The sodium hypochlorite pentahydrate crystals according to claim 2, wherein peaks further appear at the locations of the angles of diffraction described in Table 3 over a range of 10°≤2θ (angle of diffraction)≤65°.

TABLE 3

| 2θ (±0.2°) |
|---|
| 10.9 |
| 12.2 |
| 20.6 |
| 24.5 |
| 25.8 |
| 28.6 |
| 32.2 |
| 32.7 |
| 34.0 |
| 34.3 |
| 35.0 |
| 35.2 |
| 35.3 |
| 35.4 |
| 36.3 |
| 37.7 |
| 37.8 |
| 39.1 |
| 40.0 |
| 41.1 |

TABLE 3-continued

| 2θ (±0.2°) |
|---|
| 43.8 |
| 44.2 |
| 45.1 |
| 45.2 |
| 46.8 |
| 47.0 |
| 48.1 |
| 48.2 |
| 49.4 |
| 50.3 |
| 51.0 |
| 51.7 |
| 51.8 |
| 52.7 |
| 53.0 |
| 53.3 |
| 53.5 |
| 53.7 |
| 54.0 |
| 55.3 |
| 56.1 |
| 56.3 |
| 56.5 |
| 56.7 |
| 58.6 |
| 58.8 |
| 59.0 |
| 59.2 |
| 59.5 |
| 61.3 |
| 61.6 |
| 62.0 |
| 62.1 |
| 63.4 |
| 64.0 |
| 64.2 |
| 64.4 |

4. The sodium hypochlorite pentahydrate crystals according to any of claims 1 to 3, wherein the crystal structure is orthorhombic, has a primitive crystal lattice, and the size of the unit cells is such that a=16.3±0.1 (angstrom), b=5.4±0.1 (angstrom) and c=16.2±0.1 (angstrom).

* * * * *